(12) United States Patent
Mullenhoff et al.

(10) Patent No.: US 10,928,995 B2
(45) Date of Patent: Feb. 23, 2021

(54) SYSTEMS AND METHODS FOR UV PACKING

(71) Applicant: Lucasfilm Entertainment Company Ltd. LLC, San Francisco, CA (US)

(72) Inventors: Colette Mullenhoff, Millbrae, CA (US); Benjamin Neall, San Rafael, CA (US)

(73) Assignee: LUCASFILM ENTERTAINMENT COMPANY LTD. LLC, San Francisco, CA (US)

( * ) Notice: Subject to any disclaimer, the term of this patent is extended or adjusted under 35 U.S.C. 154(b) by 0 days.

(21) Appl. No.: 16/115,423

(22) Filed: Aug. 28, 2018

(65) Prior Publication Data

US 2020/0073536 A1 Mar. 5, 2020

(51) Int. Cl.
*G06F 3/0484* (2013.01)
*G06F 3/038* (2013.01)

(52) U.S. Cl.
CPC .......... *G06F 3/04842* (2013.01); *G06F 3/038* (2013.01)

(58) Field of Classification Search
None
See application file for complete search history.

(56) References Cited

U.S. PATENT DOCUMENTS

2009/0219280 A1* 9/2009 Maillot ............... G06T 15/04
                                                    345/419
2015/0356774 A1* 12/2015 Gal .................... G06T 19/20
                                                    345/633

OTHER PUBLICATIONS

Bynum Murray, "Wall Sconce UV Layout 4/4 Packing UV's", Published on Oct. 8, 2015 on Youtube, https://www.youtube.com/watch?v=WkQlclDMnm8 (Year: 2015).*
Carlos Velazquez, "How to stack UVs in Maya", Published on Jul. 3, 2017 on Youtube, https://www.youtube.com/watch?v=DLKL_DEOqX8 (Year: 2017).*
Malcolm341, "The Easiest Way to Gridify UVs in Maya", Published on May 11, 2018 on Youtube, https://www.youtube.com/watch?v=P3GfCuRFPCM (Year: 2018).*
Autodesk Knowledge Network, "System requirements for Autodesk Maya 2017", https://knowledge.autodesk.com/support/maya/learn-explore/caas/sfdcarticles/sfdcarticles/System-requirements-for-Autodesk-Maya-2017.html (Year: 2017).*

* cited by examiner

*Primary Examiner* — Tize Ma
(74) *Attorney, Agent, or Firm* — Sheppard Mullin Richter & Hampton LLP

(57) ABSTRACT

Systems, devices, and methods are disclosed for UV packing. The system includes a non-transitory computer-readable medium operatively coupled to processors. The non-transitory computer-readable medium stores instructions that, when executed, cause the processors to perform a number of operations. One operation is to present a packing map using a graphical user interface including a selection tool. Another operation is to present a first set of one or more target objects using the graphical user interface. Individual ones of the first set include one or more features. One operation is to receive a first user input. Another operation is to, based on the first user input and the one or more features corresponding to the individual ones of the first set, pack the first set into a packing map.

17 Claims, 9 Drawing Sheets

SYSTEMS AND METHODS FOR UV PACKING

SUMMARY

Embodiments of the present disclosure include systems, methods, devices, and apparatus capable of UV packing, including, for example, packing maps, one or more target objects, as well as interconnected processors and/or circuitry, to present the packing map and the one or more target objects and to receive user input.

In accordance with the technology described herein, a system for UV packing is disclosed. The system includes a non-transitory computer-readable medium operatively coupled to processors. The non-transitory computer-readable medium stores instructions that, when executed, cause the processors to perform a number of operations. One such operation is to present a packing map using a graphical user interface including a selection tool. Another such operation is to present a first set of one or more target objects using the graphical user interface. Individual ones of the first set include one or more features. Yet another operation is to receive a first user input. Another such operation is to, based on the first user input and the one or more features corresponding to the individual ones of the first set, pack the first set into a packing map.

In embodiments, the first user input includes selecting and customizing the one or more features for packing the first set of one or more target objects.

In embodiments, the first user input includes receiving a selection tool user input to move a selection tool over a first location in the packing map. The first user input also includes moving the selection tool in the graphical user interface over the first location in the packing map. The first user input includes receiving packing user input to pack the individual ones of the first set at, and around, the first location. The first user input also includes packing the individual ones of the first set at, and around, the first location in the graphical user interface.

In embodiments, the one or more features include one or more of a mesh, geometry, size, material, title, texture, paint, color, surface, and metadata.

In embodiments, when one or more features of a first target object corresponds to one or more features of a second target object, the first target object and the second target object are packed into an adjacent location in the packing map.

In embodiments, the non-transitory computer-readable medium further stores instructions that, when executed, cause the processors to stack the one or more target objects in the same location in the packing map when the one or more target objects includes a first geometry.

In embodiments, the non-transitory computer-readable medium further stores instructions that, when executed, cause the processors to simplify a geometry of an unconventional target object. The non-transitory computer-readable medium stores instructions that, when executed, cause the processors to pack the simplified target object into the packing map.

In embodiments, the simplified target object is the unconventional target object bounded by a rectangular shape.

In embodiments, the non-transitory computer-readable medium further stores instructions that, when executed, cause the processors to perform operations. One operation is to present a second set of one or more target objects. Another operation is to receive a second user input. One operation is to, based on the second user input, the one or more features corresponding to individual ones of the first set of one or more target objects and the second set of one or more target objects, and the packed first set, pack the second set of one or more target objects around the first set of the one or more target objects.

In accordance with additional aspects of the present disclosure, a computer-implemented method for UV packing includes a number of operations. One operation includes presenting a first set of one or more target objects using a graphical user interface in a first space. Individual ones of the first set of one or more target objects include one or more features. Another operation includes presenting a packing map using the graphical user interface including a selection tool. One operation includes receiving a first user input. Another operation includes, based on the user input and the one or more features corresponding to the individual ones of the first set, packing the first set of one or more target objects into a packing map.

In embodiments, the first user input includes selecting and customizing the one or more features for packing the first set of one or more target objects.

In embodiments, the first user input includes receiving a selection tool user input to move a selection tool over a first location in the packing map. The first user input also includes moving the selection tool in the graphical user interface over the first location in the packing map. The first user input includes receiving packing user input to pack the individual ones of the first set at, and around, the first location; and packing the individual ones of the first set at, and around, the first location in the graphical user interface.

In embodiments, the one or more features includes one or more of a mesh, geometry, size, material, title, texture, paint, color, and surface.

In embodiments, one operation further including packing a first target object including a first set of one or more features in a location adjacent to a second target object including at least one of the one or more features of the first set of one or more features.

In embodiments, an operation further including stacking two or more target objects of the first set of one or more target objects in the same location in the packing map when the two or more target objects include a first geometry.

In embodiments, an operation further including simplifying a geometry of an unconventional target object. One operation also includes packing the simplified target object into the packing map.

In embodiments, the simplified target object is the unconventional target object bounded by a rectangular shape.

In embodiments, another such operation is presenting a second set of one or more target objects. Another operation is receiving a second user input. One such operation is, based on the second user input, the one or more features corresponding to individual ones of the first set of one or more target objects and the second set of one or more target objects, and the packed first set, packing the second set of one or more target objects around the first set of the one or more target objects.

In accordance with additional aspects of the present disclosure, a system for UV packing. The system including a graphical user interface. the graphical user interface including a UV map. the graphical user interface including a selection tool. The graphical user interface also including one or more objects. The system also including a non-transitory computer-readable medium operatively coupled to processors and storing instructions that, when executed, cause the processors to perform a number of operations. One such operation is to present the one or more objects using the graphical user interface in the UV map. Individual ones of the one or more objects include one or more features. Another such operation is to receive selections from the one or more objects to generate a first set of one or more target objects. One such operation is to present a packing map using the graphical user interface including the selection tool. Another such operation is to receive a first user input. One such operation is to, based on the first user input and the one or more features corresponding to the individual ones of the first set, pack the first set into the UV map.

In embodiments, when one or more features of a first target object corresponds to one or more features of a second target object, the first target object and the second target object are packed into an adjacent location in the packing map.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Digital models (including, for example three-dimensional models) may be prepared to be digitally painted and otherwise edited. Preparing the digital models may include unwrapping the models by separating the digital models into one or more objects, which may be, for example, two-dimensional objects; flattening the one or more objects to prevent distortion from moving from one dimension to another dimension; cutting the digital models, unfolding the digital models, and/or other methods of preparation. Existing editors may prepare the digital models by packing all of the different objects of the model into a packing map ready for editing. Some editors may pack the one or more objects based only on spatial efficiency without accounting for context of the individual objects. Often, packing can be a tedious ordeal that may require manual input of locations in the packing map to place the objects. Existing tools do not include customization to help automate the process and minimize the time spent moving the parts of the model into the packing map.

Embodiments of the present disclosure are directed to systems and methods for UV packing. In various deployments described herein, a graphical user interface may include a packing map and one or more target objects. Each of the one or more target objects may have one or more features. The user may interact with the graphical user interface to indicate where the one or more target objects should be packed in the packing map. For example, using a selection tool, such as a cursor, the user may indicate a location where the one or more target objects should start packing the one or more target objects in the packing map and use a single or combination of keystrokes to initiate the packing of the one or more target objects. In another example, the target objects may be spatially grouped together in the packing map based on at least one common feature (e.g., shape, material, color, mesh, etc.). In one example, additional target objects may be packed around target objects that have already been packed.

Figure 1:
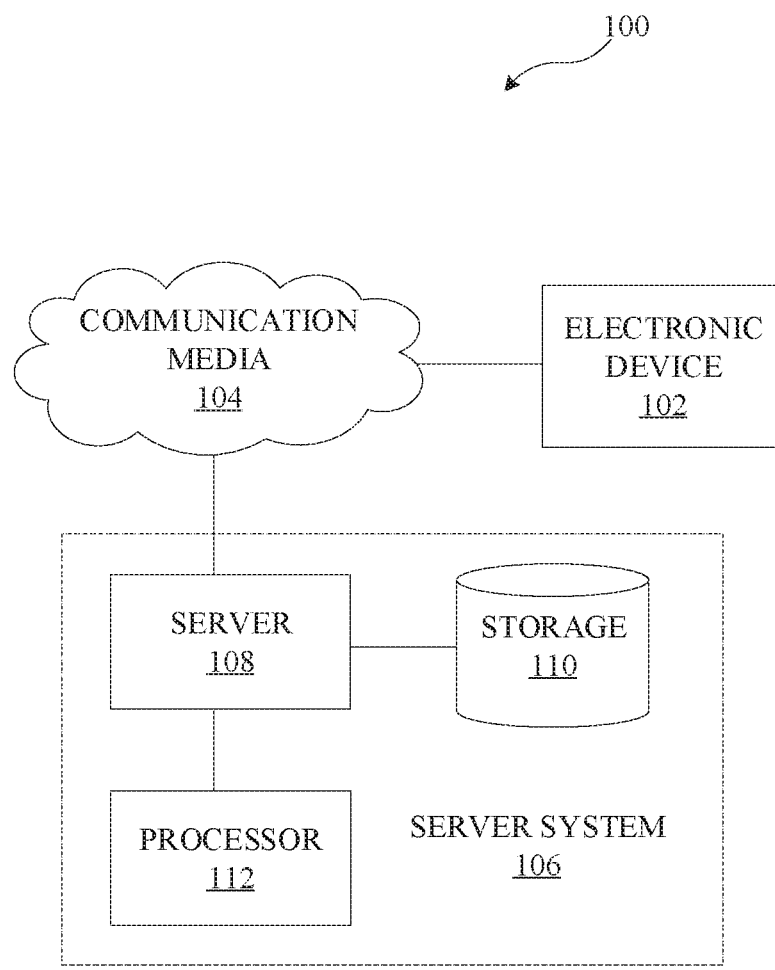
FIG. 1 illustrates an example environment in which embodiments of the disclosure may be implemented.

FIG. 1 depicts example environment 100, which may be used in connection with implementing embodiments of the disclosed systems, methods, and devices. By way of example, the various below-described components of FIG. 1 may be used for UV packing. For example, electronic device 102 may include a graphical user interface. The graphical user interface may include a packing map and one or more target objects, derived from a multi-dimensional model. The graphical user interface may also include a selection tool to pick at least one of the one or more target objects and to select a location in the packing map. When packing is initiated by the user, the at least one of the one or more target objects may be packed at and around the location selected by the user. A target object may include parts of an original model, such as, for example, a handle of a virtual baseball bat, the head of a virtual gorilla, the wheels on a virtual car, etc., to be used in a game, movie, and/or other type of content with virtual/digital models.

In embodiments, the packing map may be a UV map, where U and V individually represent the axes of the two-dimensional space in the packing map, instead of x, y, and z coordinates because x, y, and z are reserved for the original models on which the one or more target objects are based. The UV map may use UDIMs to designate a location in the UV map, such that a first UDIM is 1001, the adjacent UDIM to the right is 1002 and so on, and a new row may start after ten units in the U direction. UDIM may be a form of notation for two dimensional UV coordinates to more easily denote a given location in the UV map. It should be appreciated that other packing maps may be used.

In some embodiments, the one or more target objects may or may not be unwrapped, unfolded, and/or otherwise prepared for editing. When a given target object is not prepared for editing, which may be referred to as an unconventional target object, the geometry of the unconventional target object may be simplified so that the unconventional target object may be packed. The geometry may be simplified by bounding edges of the unconventional target object by a shape, such as, for example, a rectangle, oval, circle, triangle, and/or other shapes. Bounding may be the process of placing the smallest possible simple shape that has been prepared for editing, such as, for example, a rectangle, along the external edges of the unconventional target object and limiting the unconventional target object to the dimensions of the simple shape prepared for editing. Instead of trying to process and pack an unconventional object that may not be prepared for editing, leading to various errors, a bounded unconventional target object may be packed because it is processed as a simple shape that has been prepared for editing (e.g., a two-dimensional rectangle placed over an unconventional target object is processed as a two-dimensional rectangle). The original shape and geometry of the unconventional target object may be preserved during bounding within the simple shape prepared for editing. The simplified geometry may be packable without distortion to the unconventional target object. Existing solutions may give errors, produce a distorted UV, and/or otherwise stop the packing process from starting and/or continuing for unconventional target objects.

The one or more target objects may include one or more features (e.g., mesh, geometry, size, material, texture, surface, color, title, metadata, and/or other features). The one or more target objects may be packed according to the one or more features and user input. In embodiments, the one or more target objects may be packed in a given UDIM based on the one or more features and the user input. In some embodiments, the one or more features selected by the user may be prioritized and further customized.

A mesh may include one or more target objects that correspond to a structurally continuous portion of an original model. For example, the original model may include a baseball bat and a ball. The ball may include one or more target objects that all belong to the same mesh, the ball. In some embodiments, the mesh may include user-selected components of the model. For example, a humanoid model may be separated into a left foot mesh, a left leg mesh, a left torso mesh, a left arm mesh, a left head mesh, and corresponding right side meshes. It should be appreciated that meshes may be otherwise defined.

The geometry may include the shapes of the one or more target objects (e.g., simple shapes, such as squares, rectangles, triangles, etc.; complex shapes, such as heads, bodies, cars, etc.; and/or other shapes). The size of the one or more targets may correspond to the coordinates in the packing map or as coordinates in the original space of the model. In embodiments, the one or more target objects and/or models with similar geometries and/or sizes may be stacked on each other in the same UDIM. As described above, similar geometries may be packed in a given UDIM. Similar geometries may be broadly defined (e.g., hexagons and pentagons are similar, squares of all sizes are similar, all shapes with more than five sides are grouped together, all shapes with less than six sides are grouped together, shapes with curved lines are grouped together, etc.) or narrowly defined (e.g., only rectangles that are 2 units long and 1 unit wide are grouped together, only squares with an area of 1 unit are grouped together, only equilateral triangles are grouped together, etc.). It will be appreciated that other definitions may be used for similar geometries.

The material may include what the surface of a target object is and/or appears to be when rendered. For example, an eyeball, may have different material than fur, skin, or metal. The texture may include more specific information on the material. Continuing the example above, dry skin compared to soft skin or shiny metal compared to dull metal. The surface may include anything else that will be appreciated to relate to the surface appearance of the one or more target objects. The color may include the colors to appear, the granularity of colors, how the one or more target objects are colored, etc. As described above, similar materials, textures, surfaces, and/or colors may be packed in a given UDIM. Moreover, the definition of similar may vary from a broad definition to a narrow definition.

The title may include user input corresponding to a name for a given target object. The user may decide to give the same title for multiple target objects. Metadata may include when a given target object was generated from the model, which user generated a given target object, last date the given target object was packed, and/or other information about the one or more target objects that would be appreciated. As described above, target objects with similar titles and/or metadata may be packed in a given UDIM. Moreover, the definition of similar may vary from a broad definition to a narrow definition. As will be appreciated, more than one feature may be used and/or customized to define how the one or more target objects are packed.

The user input may include moving the selection tool into a location in the packing map and initiating packing of the one or more target objects. Electronic device 102 may receive the user input and move the selection tool accordingly. The selection tool may include a cursor, an indicator, and/or other selection tool to indicate a current location, such as, for example, a given UDIM and/or a given location within a given UDIM, for user interaction on the graphical user interface. The user may initiate packing the one or more target objects with a keystroke, such as a user-defined hotkey, using a keyboard or other device (not shown) connected, integrated, or otherwise coupled to electronic device 102; a dropdown menu where additional customizations may be included to prioritize, enable, and/or otherwise customize the one or more features, as described herein; a button in a toolbar in the graphical user interface; and/or other methods. Electronic device 102 may receive the user input and initiate packing accordingly. It should be appreciated that other user input may be used to initiate packing.

When the one or more target objects are packed, the one or more target objects may be scaled to efficiently fill a given UDIM. Scaling may include resizing a target object while preserving its aspect ratio (e.g., a 3×1 rectangle may be scaled up to a 9×3 rectangle, and vice versa). The one or more target objects may be scaled down to pack the one or more target objects with one or more similar features, as described herein, in a given UDIM. A first set of one or more target objects with a first set of one or more features may be scaled at a different value than a second set of one or more target objects with a second set of one or more features. Scaling may be determined based on user input (e.g., the most efficient packing for the one or more target objects in a UDIM, preserving the aspect ratio of the one or more target objects, preserving an original size of the one or more target objects, scaling to the largest target object in the set of one or more target objects with similar features, scaling to the smallest target object in the set of one or more target objects with similar features, scaling to a selected target object in a set of one or more target objects with one or more similar features, etc.).

Storage may be saved and rendering may be optimized when the one or more target objects are packed together based on the one or more features and the user input. Moreover, editing the one or more target objects packed together based on the one or more features and user input may be easier when the one or more target objects are spatially adjacent or in relatively close proximity in the packing map.

As shown in FIG. 1, environment 100 may include one or more of electronic device 102 and server system 106. Electronic device 102 can be coupled to server system 106 via communication media 104. As will be described in detail herein, electronic device 102 and/or server system 106 may exchange communications signals, including user input, one or more target objects, the corresponding features of the one or more target objects, location of the selection tool, metadata, and/or other information for electronic device 102 via communication media 104.

Electronic device 102 may include a variety of electronic computing devices, such as, for example, a smartphone, tablet, laptop, wearable device, and similar devices. Here, a graphical user interface of electronic device 102 may perform such functions as accepting and/or receiving user input and displaying content. The graphical user interface may be provided by various operating systems known in the art, such as, for example, iOS, Android, Windows Mobile, Windows, Mac OS, Chrome OS, Linux, Unix, a gaming platform OS (e.g., Xbox, PlayStation, Wii), and/or other operating systems.

In various embodiments, communication media 104 may be based on one or more wireless communication protocols such as Bluetooth®, ZigBee, 802.11 protocols, Infrared (IR), Radio Frequency (RF), 2G, 3G, 4G, 5G, and/or wired protocols and media. Communication media 104 may be implemented as a single medium in some cases.

As mentioned, electronic device 102 may take a variety of forms, such as a desktop or laptop computer, a smartphone, a tablet, a smartwatch or other wearable electronic device, a television or other audio or visual entertainment device or system, a camera (including still shot or video) or the like. Electronic device 102 may communicate with other devices and/or with one another over communication media 104 with or without the use of server system 106. In various embodiments, electronic device 102 and/or server system 106 may be used to perform various processes described herein and/or may be used to execute various operations described herein with regard to one or more disclosed systems and methods. Upon studying the present disclosure, it will be appreciated that environment 100 may include multiple electronic devices 102, communication media 104, server systems 106, servers 108, processors 112, and/or storage 110.

As mentioned, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Further, communication media 104 may be implemented using various wireless standards, such as Bluetooth, Wi-Fi, 3GPP standards (e.g., 2G GSM/GPRS/EDGE, 3G UMTS/CDMA2000, 4G LTE/LTE-U/LTE-A, 5G). Upon reading the present disclosure, it will be appreciated that there are other ways to implement communication media 104 for communications purposes.

Likewise, though not shown, it will be appreciated that a similar communication medium may be used to connect or communicatively couple server 108, processors 112, and/or storage 110 to one another, in addition to other elements of environment 100. In example embodiments, communication media 104 may be, or include, a wired or wireless wide area network (e.g., cellular, fiber, and/or circuit-switched connection) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, and/or standard AV), which may be used to communicatively couple aspects of environment 100 that may be relatively close, geographically. In some embodiments, server system 106 may be remote from electronic device 102.

Server system 106 may provide, receive, collect, or monitor information from electronic device 102, such as, for example, user input, one or more target objects, the corresponding features of the one or more target objects, location of the selection tool, metadata, and the like. Server system 106 may be configured to receive or send such information via communication media 104. This information may be stored in storage 110 and may be processed using processors 112. For example, processors 112 may include an analytics engine capable of performing analytics on information that server system 106 has collected, received, or otherwise interacted with, from electronic device 102. In embodiments, server 108, storage 110, and processors 112 may be implemented as a distributed computing network or as a relational database or the like.

Server 108 may include, for example, an Internet server, a router, a desktop or laptop computer, a smartphone, a tablet, a processor, a component, or the like, and may be implemented in various forms, including, for example, an integrated circuit or collection thereof, a printed circuit board or collection thereof, or in a discrete housing/package/rack or multiple of the same.

In embodiments, server 108 directs communications for electronic device 102 over communication media 104. For example, server 108 may process and exchange messages for electronic device 102 that correspond to user input, one or more target objects, the corresponding features of the one or more target objects, location of the selection tool, metadata, and/or other information. Server 108 may update information stored on electronic device 102, for example, by delivering user input, one or more target objects, the corresponding features of the one or more target objects, location of the selection tool, metadata, and/or other information thereto. Server 108 may send/receive information to/from electronic device 102 in real time or sporadically. Further, server 108 may implement cloud computing capabilities for electronic device 102.

Figure 2:
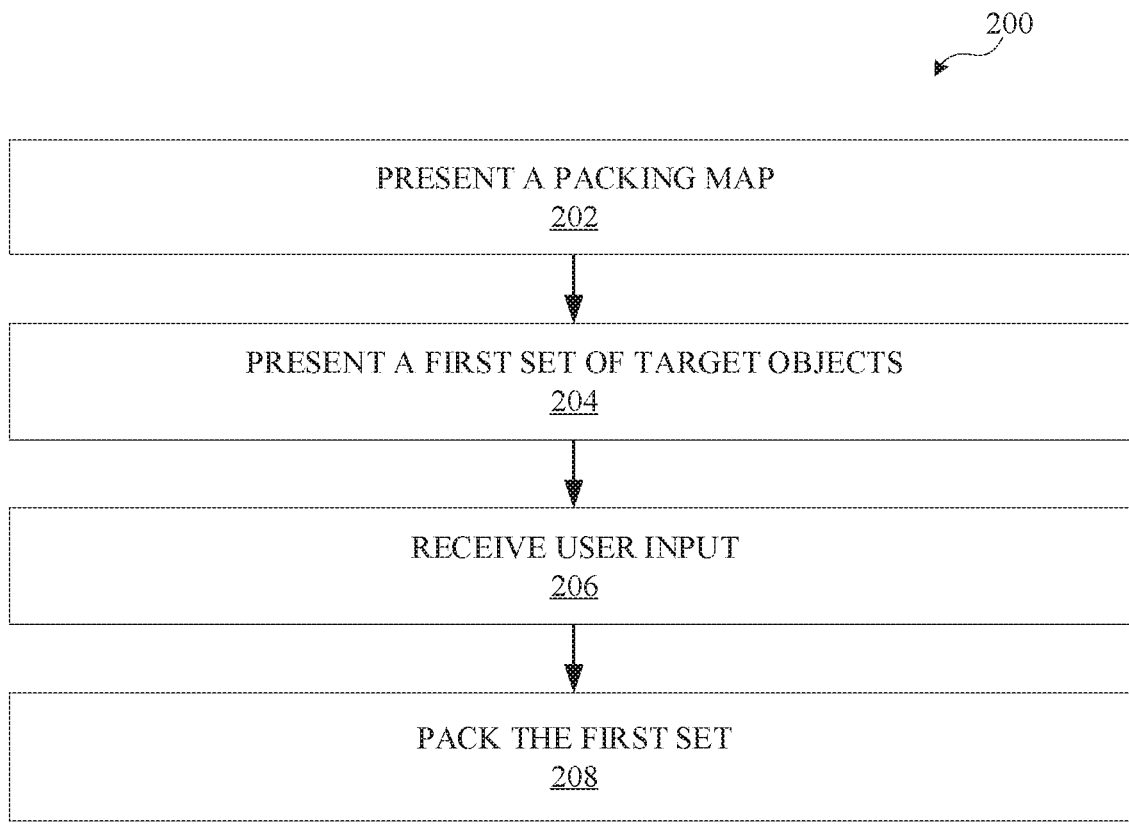
FIG. 2 is an operational flow diagram illustrating various operations that may be performed in accordance with embodiments of the disclosure.

FIG. 2 illustrates a flow diagram depicting various operations of method 200, and accompanying embodiments for UV packing, in accordance with aspects of the present disclosure. The operations of the various methods described herein are not necessarily limited to the order described or shown in the figures, and it will be appreciated, upon studying the present disclosure, variations of the order of the operations described herein that are within the spirit and scope of the disclosure.

Figure 9:
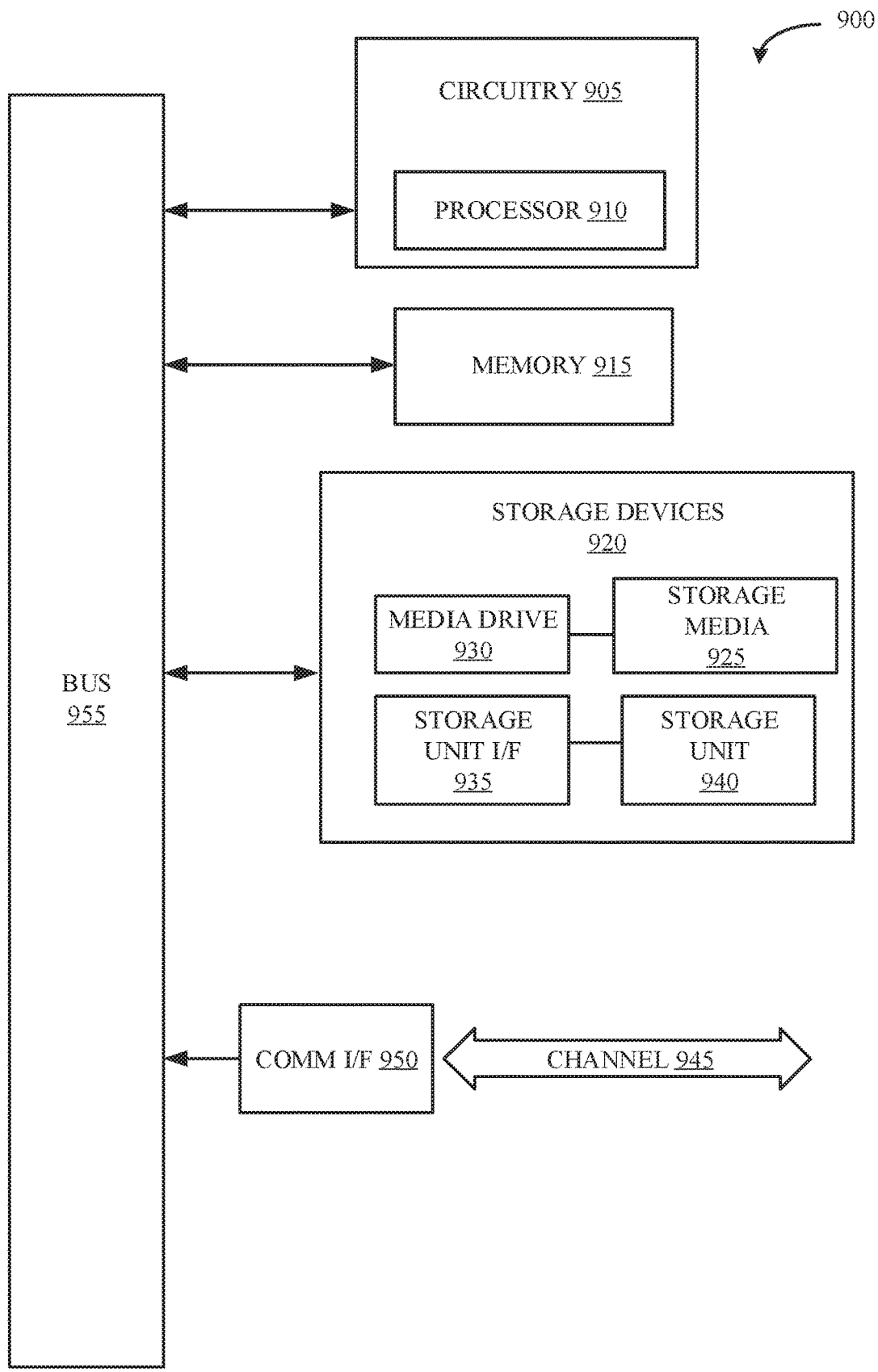
FIG. 9 illustrates an example computing component that may be used to implement features of various embodiments of the disclosure.

The operations and sub-operations of method 200 may be carried out, in some cases, by one or more of the components, elements, devices, and circuitry of environments 100, device 102, communication media 104, server system 106, server 108, processor 112, and/or computing component 900, described herein and referenced with respect to at least FIGS. 1 and 9, as well as sub-components, elements, devices, and circuitry depicted therein and/or described with respect thereto. In such instances, the description of methods 200 may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-)components, elements, devices, circuitry, etc., including variations thereof, may be applied to the various operations described in connection with methods 200 without departing from the scope of the present disclosure.

At operation 202, method 200 includes presenting or displaying a packing map. The packing map may be presented on a graphical user interface of an electronic device, as described herein. The packing map may be a UV map. The graphical user interface may include a selection tool, such as a cursor, described in greater detail above.

At operation 204, method 200 includes presenting a first set of one or more target objects. For example, as described above, a target object may be a portion of a larger original model (e.g., half of a virtual baseball, the handle of a baseball bat, the front torso of a virtual gorilla, or the different parts of a virtual car to be included in content, such as a motion picture, animated programming, or game. The first set of one or more target objects may be presented on the graphical user interface. The first set of one or more target objects may be all of the objects or a user-selected subset of all of the objects. Individual ones of the one or more target objects may include one or more features, as described above. In embodiments, one or more objects may be presented, and a user may select a first set of one or more target objects to be packed. The electronic device may receive the user selections and select the first set of one or more target objects to be packed.

At operation 206, method 200 includes receiving a first user input. The first user input may include a user moving the selection tool to a given location in the packing map and initiating packing of the first set of the one or more target objects. Initiating packing may include various mechanisms, as described above. In embodiments, the first user input may include customizing, selecting, and/or prioritizing the one or more features to inform the packing.

At operation 208, method 200 includes packing the first set of one or more target objects. Packing the first set of one or more target objects may be based on the user input and the one or more features of the one or more target objects, as described in greater detail above. As described above, unconventional target objects may also be packed after the geometry of the unconventional target object is simplified.

As will be appreciated, method 200 may be repeated for additional sets of one or more target objects. In embodiments, the additional target objects may be packed around one or more packed objects, which may include utilizing empty spaces in packed UDIMs or packing the additional sets of one or more target objects into additional UDIMs.

Figure 3:
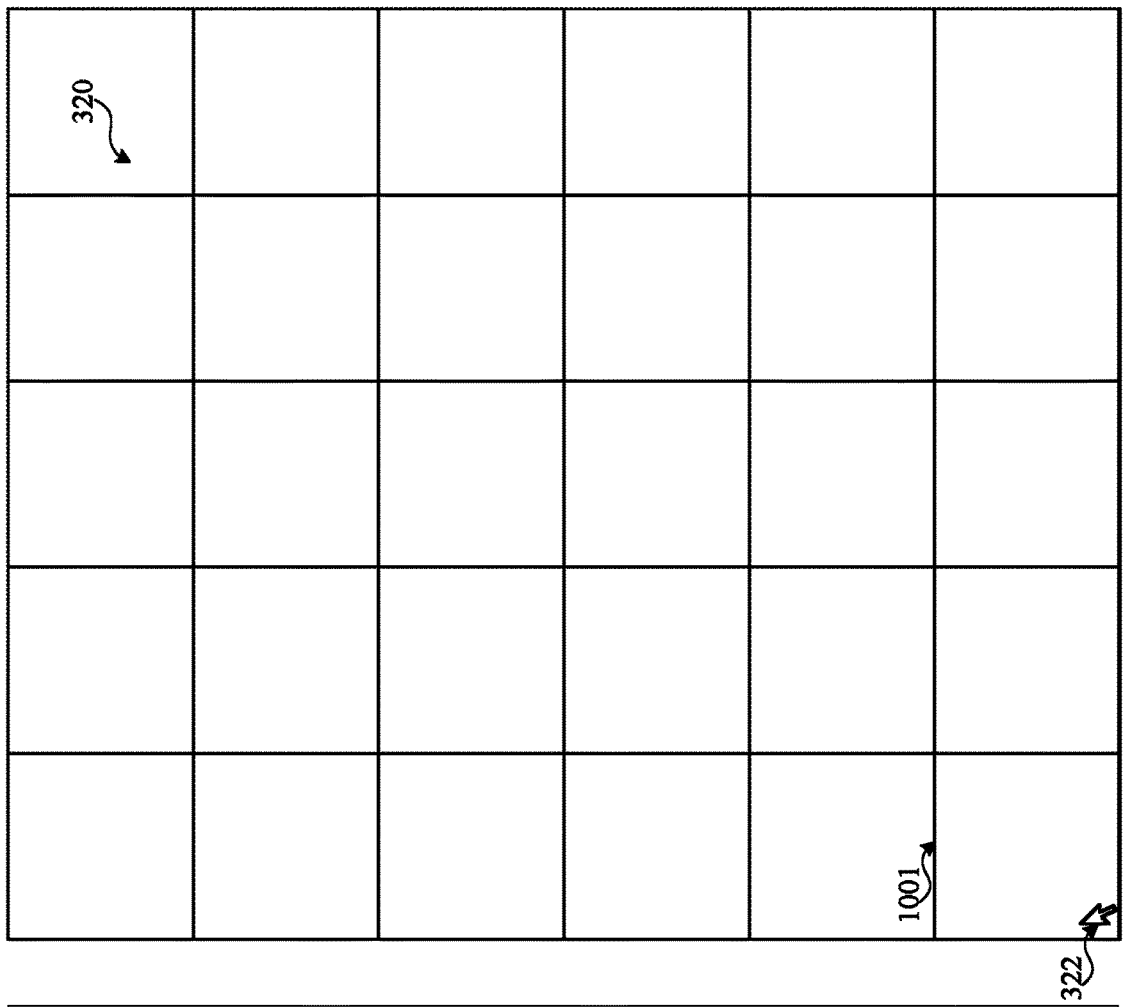
FIG. 3 illustrates an example graphical user interface with one or more target objects, in accordance with embodiments of the disclosure.
Figure 3:
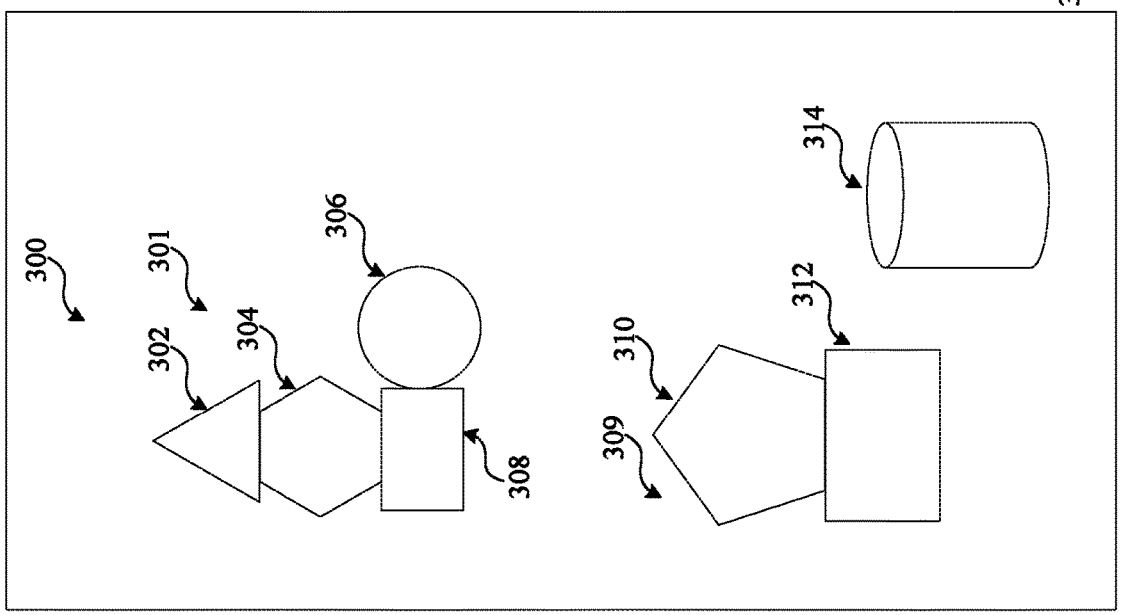

FIG. 3 illustrates an example graphical user interface with one or more objects, in accordance with embodiments of the disclosure. As illustrated, target objects are located in window 300 of a graphical user interface. Window 300 may include model 301 with target objects 302, 304, 306, and 308; model 309 with target objects 310 and 312; and unconventional target object 314. Models 301 and 309 may be compilations of simple shapes, but it will be appreciated that complex models, as described above, may be used with the technology described herein. Models 301 and 309 may be two-dimensional and unconventional target object 314 may not be prepared for editing (e.g., the unconventional target object has not been properly cut, unfolded, flattened, etc.). Cutting a target object may include separating out parts of original model into paintable pieces (e.g., separating out a digital shirt into a front half, a back half, and two sleeves). Unfolding a target object may include transforming a three-dimensional original model into a two-dimensional representation of the original model (e.g., making a three-dimensional globe into a two-dimensional map and, in some embodiments, stretching and distorting the model such that when the two-dimensional map is re-applied to the three-dimensional globe, no distortions appear). Flattening a target object may be making a two-dimensional representation of a three-dimensional object based on a given perspective (e.g., based on an aerial perspective of a sphere, flattening the sphere into a circle). Models 301 and 309 may be prepared for editing, and although models 301 and 309 appear to be unitary objects, they are separated into their corresponding shapes and appear unitary for example purposes. Unconventional target object 314 may not be prepared for editing (e.g., an unconventional target object), as described above. As will be appreciated three-dimensional models may be presented in window 300 that are prepared for editing (e.g., cut, unfolded, flattened, etc.).

Packing map 320 in the graphical user interface may include selection tool 322 in the bottom left corner in UDIM 1001. Packing map 320 may be a portion of the entire packing map, which may be 10 units across, as described above. In embodiments, window 300 and window 320 may be the same window.

Figure 4:
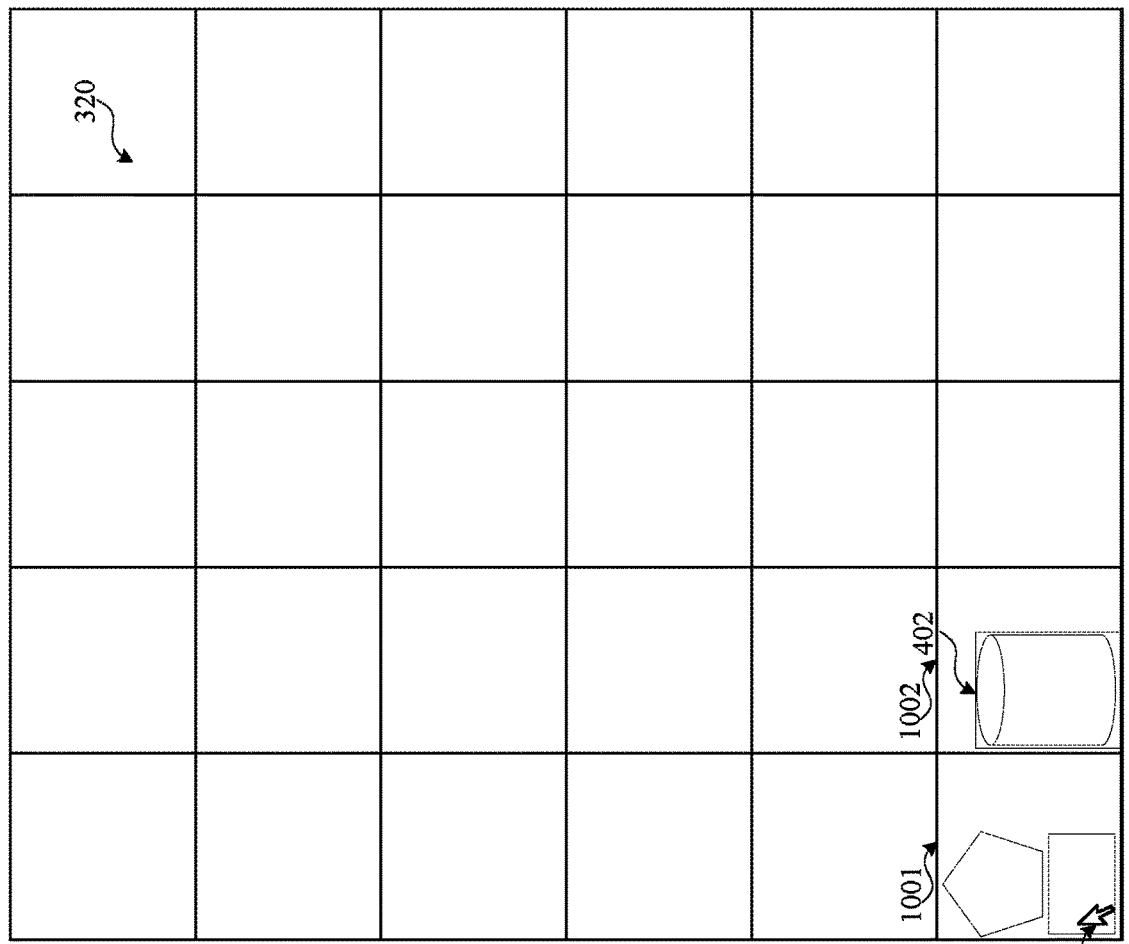
FIG. 4 illustrates an example graphical user interface with one or more packed objects, in accordance with embodiments of the disclosure.
Figure 4:
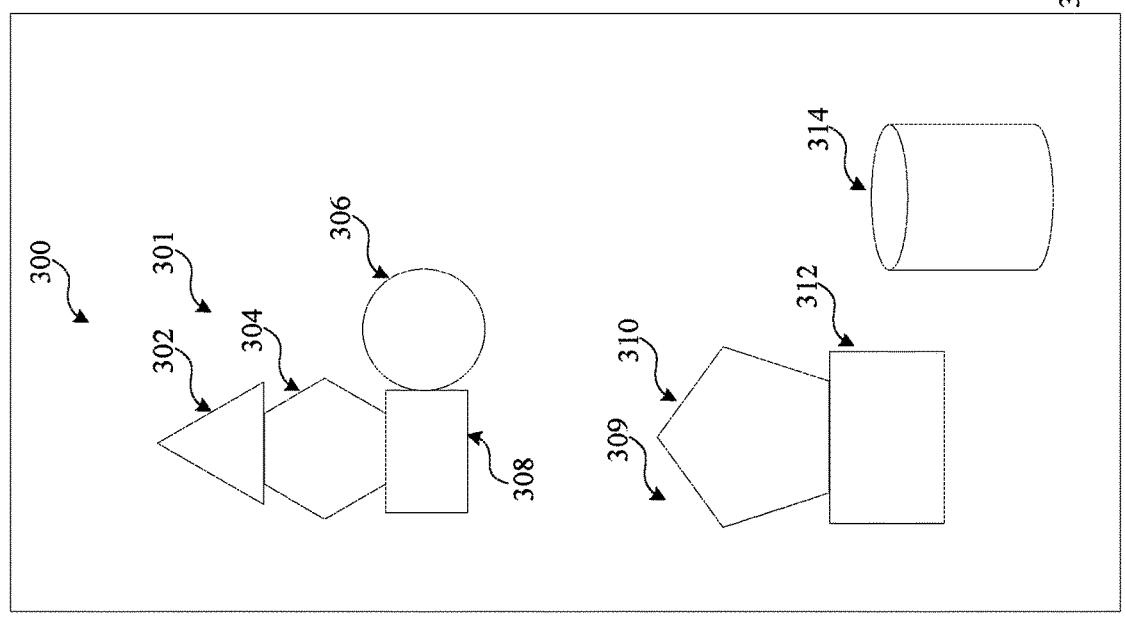

FIG. 4 illustrates an example graphical user interface with one or more packed objects, in accordance with embodiments of the disclosure. As described above, the graphical user interface may include models 301 and 309 and unconventional target object 314. As illustrated, FIG. 4 may depict preparing and packing unconventional target objects. Model 309 and unconventional target object 314 may be selected by a user for packing. Selection tool 322 may be in the bottom left corner of UDIM 1001. Model 309 may be a mesh, as described above. Model 309 and unconventional target object 314 may be packed according to a corresponding mesh.

Meshes may be determined based on metadata generated when the original model was created (e.g., a first set of one or more target objects correspond to a leg of the original model, a second set of one or more target objects correspond to a head of the original model, a third set of one or more target objects correspond to a torso of the original model, etc.) or metadata input by the user (e.g., labels, author, time stamps, etc.). For example, a user may want the leg pieces of an original model of a gorilla to be packed adjacent to each other by typing in "leg" into a packing map user interface. Accordingly, the one or more target objects labeled "leg" are placed in UDIM 1001. A target object may have multiple pieces of metadata. For example, continuing the example above, the one or more target objects with "leg" metadata may also have a metadata label, "George." Accordingly, when a user inputs "George" as a feature used to pack the one or more target objects, the one or more target objects, such as, for example, the "legs," the "arms," the "torso," and the "head" of "George," may be packed adjacent to each other, and in some embodiments, in the same UDIM.

Accordingly, shapes 310 and 312 of model 309 are packed in UDIM 1001 and unconventional target object 314 is packed in UDIM 1002. Box 402 represents simplified unconventional target object 314. The original unconventional target object 314 may have been bounded by box 402 before packing unconventional target object 314, as described above. As a result, unconventional target object 314 may be packable after the simplification. As will be appreciated, other shapes may be used to bound unconventional target objects, as described above. A user may be able to easily notice unconventional target object 314 and go back and prepare unconventional target object 314 at a later time, instead of having to find the error and correct it on the fly before packing the remaining target objects or having other issues, as described above.

Figure 5:
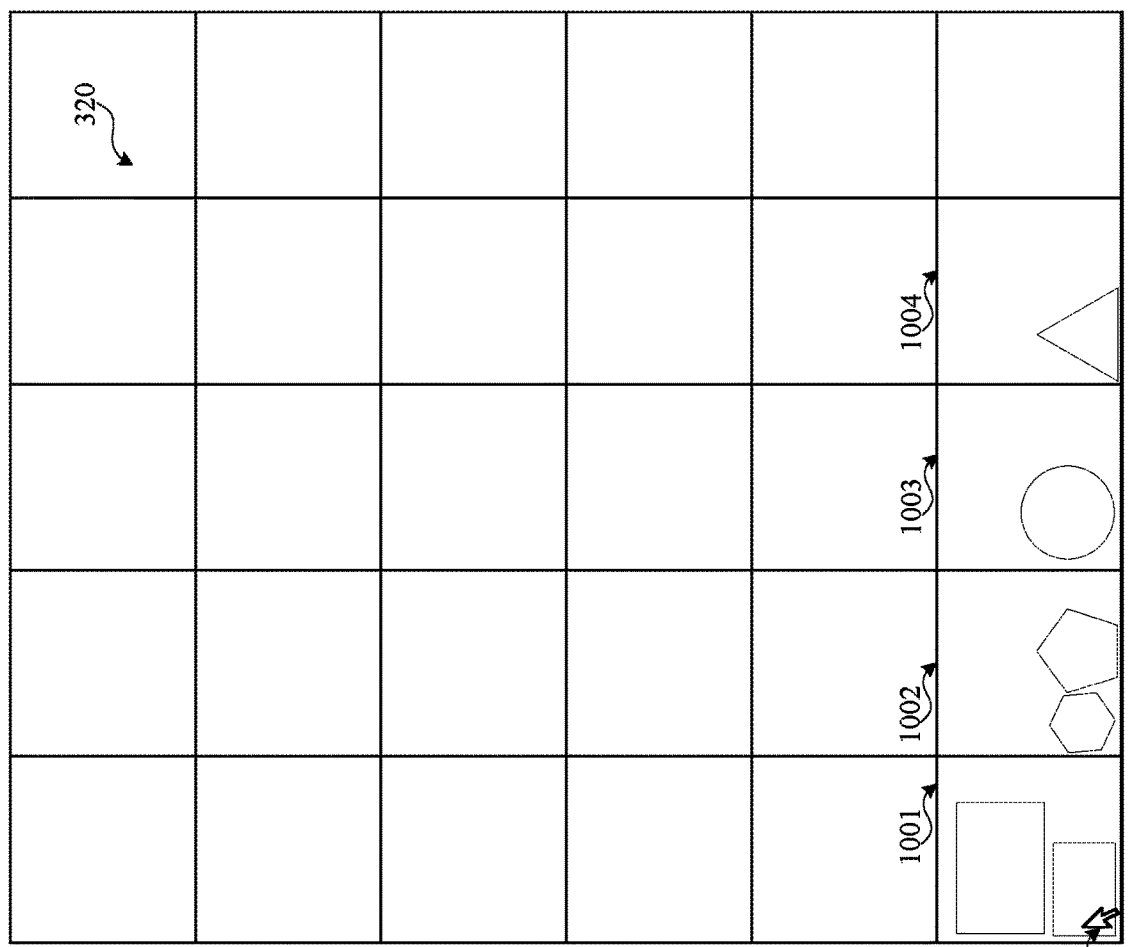
FIG. 5 illustrates an example graphical user interface with one or more packed objects, in accordance with embodiments of the disclosure.
Figure 5:
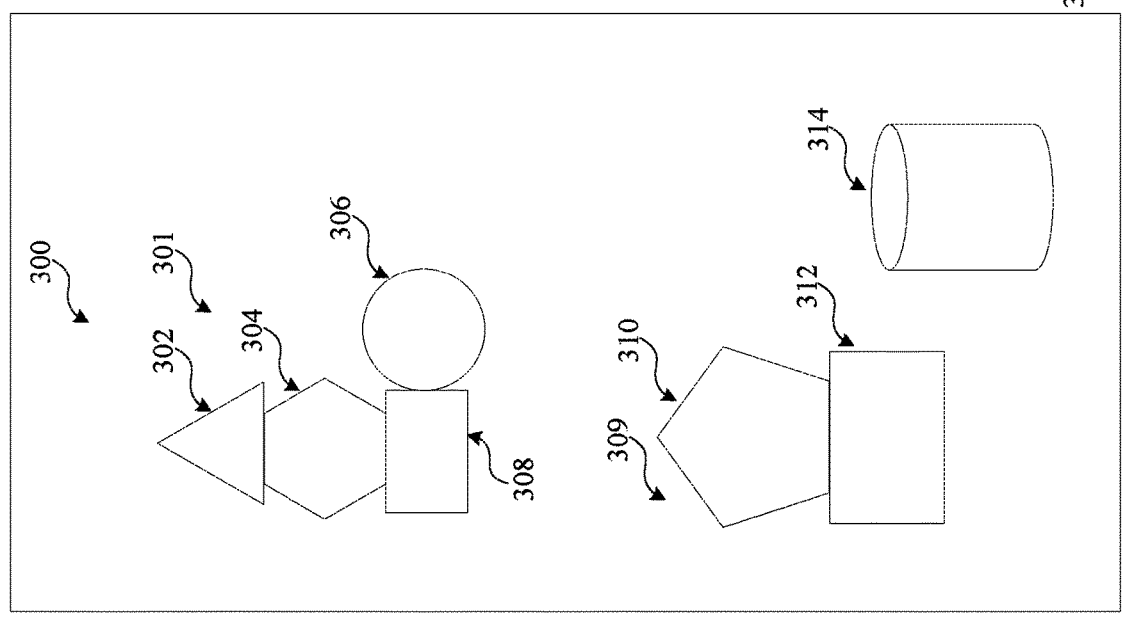

FIG. 5 illustrates an example graphical user interface with one or more packed objects, in accordance with embodiments of the disclosure. As described above, the graphical user interface may include models 301 and 309 and unconventional target object 314. As illustrated, FIG. 5 may depict packing models according to user input selecting one or more features, such as geometry. Models 301 and 309 may be selected by the user for packing. The user may have provided user input selecting one or more features to pack models 301 and 309. The selected feature may be geometry. Accordingly, rectangles may be packed in UDIM 1001, pentagons and hexagons may be packed in UDIM 1002, circles may be packed in UDIM 1003, and triangles may be packed in UDIM 1004. As described above, the definition of geometry may be broad or narrow. As illustrated, the geometry may include pentagons and hexagons in the same UDIM, as well as rectangles of different size ratios. In other examples, all rectangles may be placed in one UDIM, all shapes with five or more sides may be in another UDIM, and all other shapes may be in a third UDIM.

Figure 6:
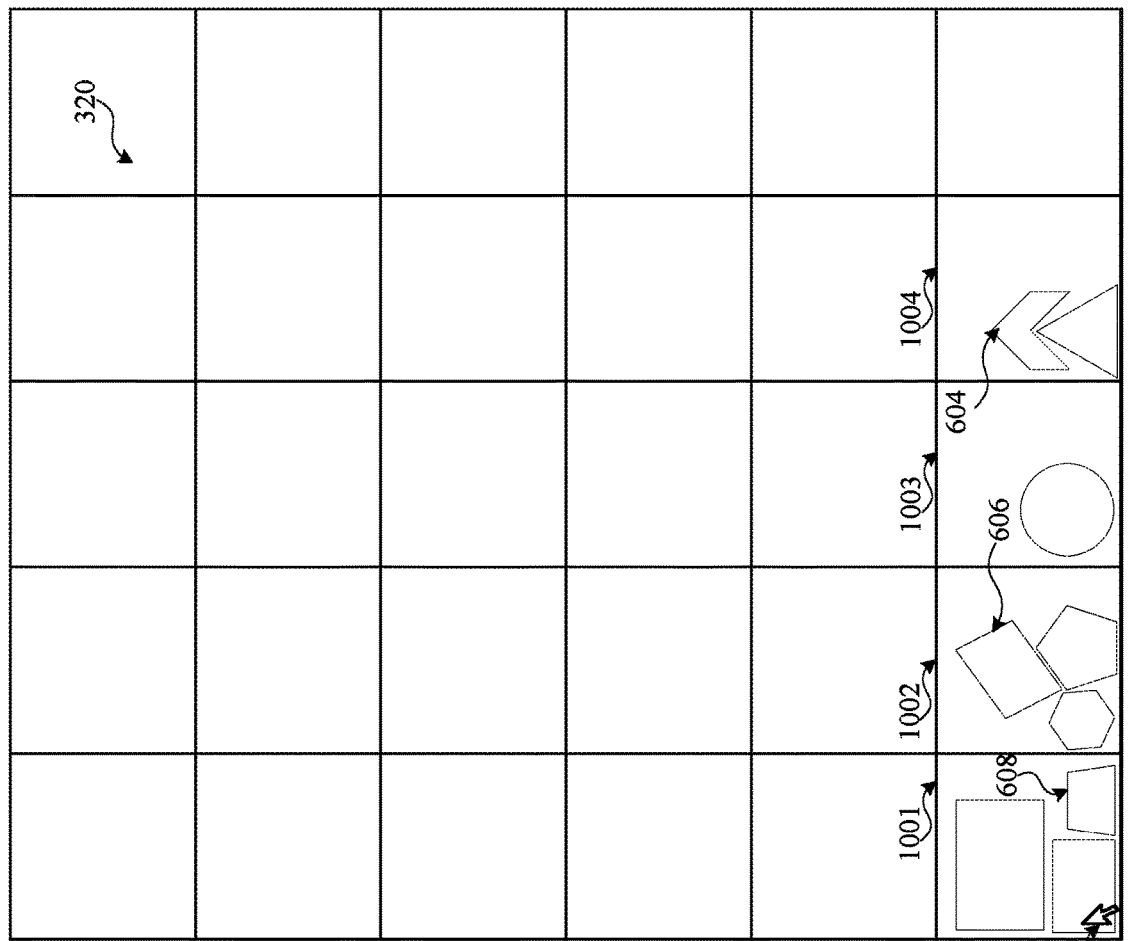
FIG. 6 illustrates an example graphical user interface with one or more packed objects, in accordance with embodiments of the disclosure.
Figure 6:
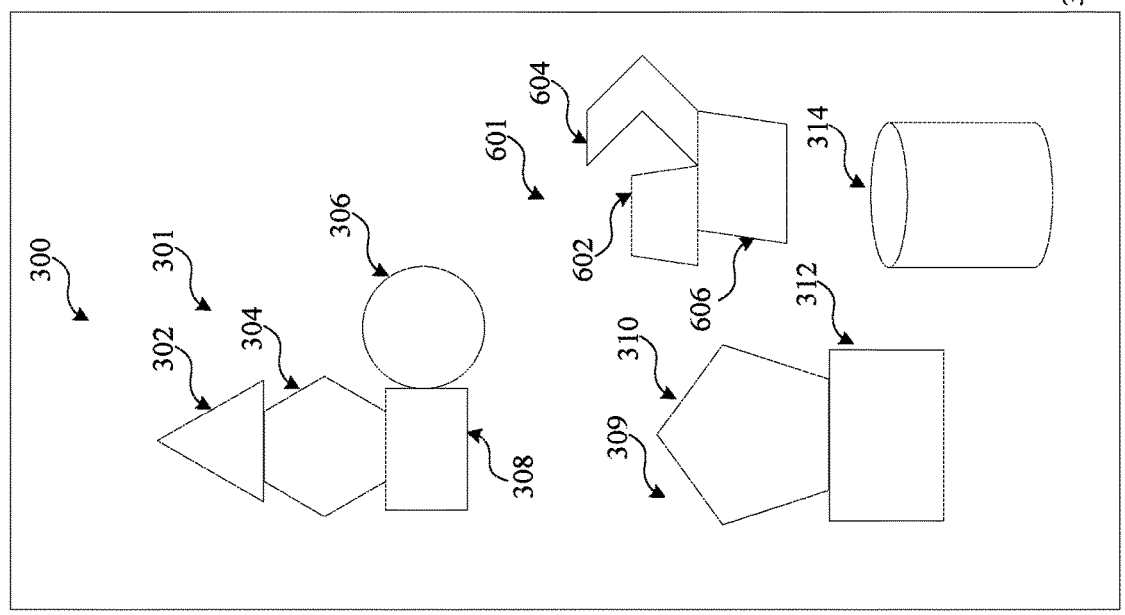

FIG. 6 illustrates an example graphical user interface with one or more packed objects, in accordance with embodiments of the disclosure. As described above, the graphical user interface may include models 301 and 309 and unconventional target object 314. In addition, FIG. 6 may include model 601 with target objects 602, 604, and 606 that may have been added after models 301 and 309 were packed. As illustrated, FIG. 6 may depict user input indicating that additional target objects are to be packed around packed target objects. Model 601 may be selected by the user for packing. As illustrated, geometry may be the selected feature to pack models 301, 309, and 601.

Accordingly, with the additional user input to pack around packed target objects, target object 608 may be packed in UDIM 1001, target object 606 may be packed in UDIM 1002, and target object 604 may be packed with UDIM 1004. Target object 608 may be packed in UDIM 1001 because target object 608 is a four-sided figure. Target object 606 may be packed into UDIM 1002 because target object 606 could not fit in UDIM 1001, because the parallelogram shape is closer to pentagons and hexagons (e.g., rectangles and squares may be packed together, based on user input, and other shapes with multiple sides, such as parallelograms, diamonds, hexagons, dodecahedrons, etc. may be packed in at least one other group), and/or other reasons. In embodiments, the packed shapes in UDIM 1001 may be rescaled to fit target objects 606 and 608. Target object 604 may be packed in UDIM 1004 with the target object 302 because target object 604 is similar to a triangle.

For example, trained shape recognition algorithms may be used to identify shapes that resemble a user selected shape (e.g., square, triangle, circle, etc.). In one embodiment, for one or more additional target objects that are packed around one or more already packed target objects, the one or more additional target objects may be compared against the one or more already packed target objects. For example, target object 604 may be scaled to try and match one of the already packed target objects in UDIM 1001, 1002, 1003, and 1004. Matching may be based on scaling the one or more additional target objects to fit in one of the one or more already packed target objects. A given additional target object may be matched and packed in the same UDIM as a given already packed target object when the given additional target object occupies the most space as a percentage of the given already packed target object compared to the other one or more already packed target objects. In other words, target object 604 may occupy about 20% of a target object in UDIM 1001 when scaled to fit inside one of them, about 40% when scaled to fit within a target object in UDIM 1002 and 1003, and about 60% when scaled to fit within a target object in UDIM 1004. Accordingly, target object 604 is placed in UDIM 1004 because it occupies the most space, compared to the other already packed target objects, when scaled to fit within the already packed target object in UDIM 1004.

In embodiments, the UV packer may prioritize sides of a target object, based on user input, over the shape of a target object (e.g., target object could be placed in UDIM 1002 in FIG. 6 because it has six sides). The number of sides of a target object may be one piece of metadata associated with a target object. For example, when target object 604 was prepared for editing, metadata may have been generated by a user that target object 604 has six sides. In some embodiments, the number of sides of a target object may be detected using machine learning algorithms related to shape and image recognition. In embodiments, user input may be provided to pack additional target objects into separate UDIMs.

Figure 7:
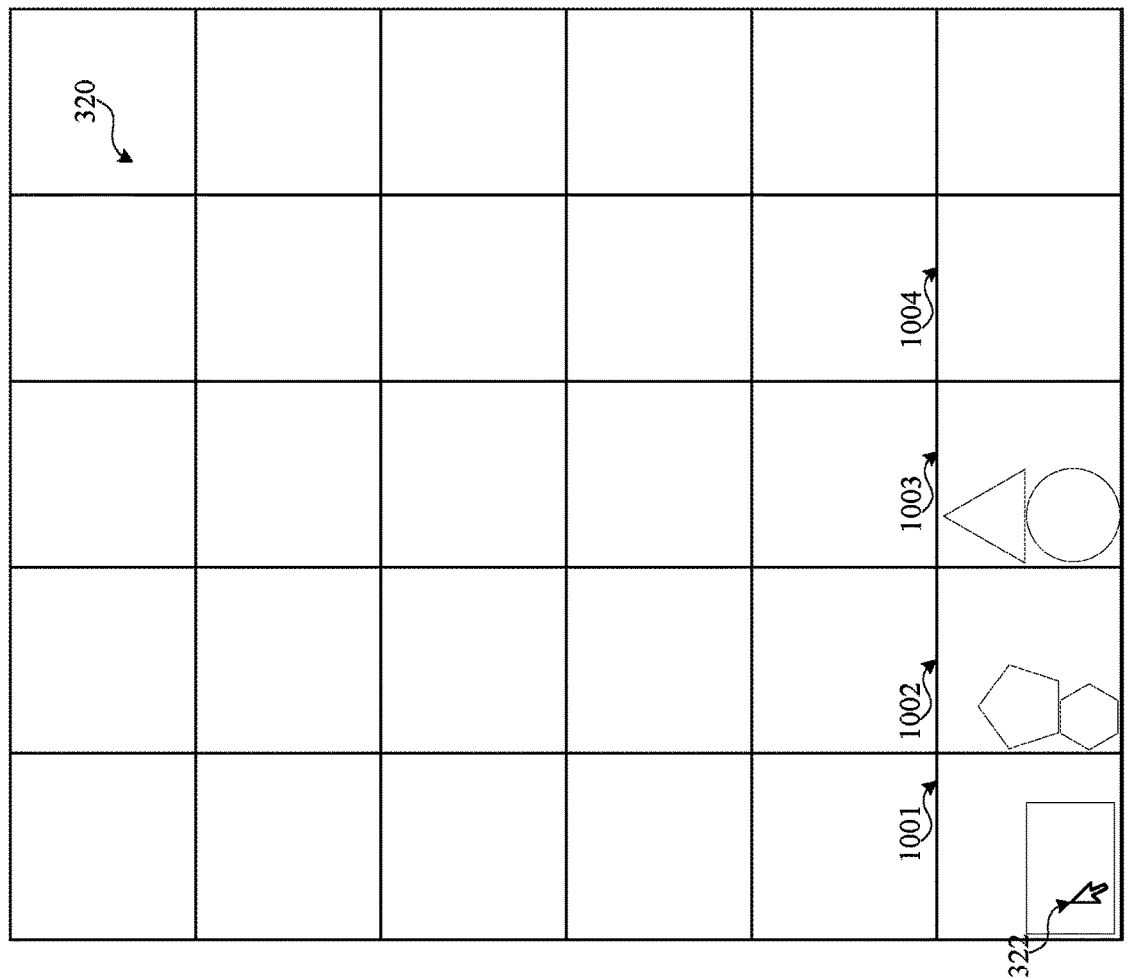
FIG. 7 illustrates an example graphical user interface with one or more packed objects, in accordance with embodiments of the disclosure.
Figure 7:
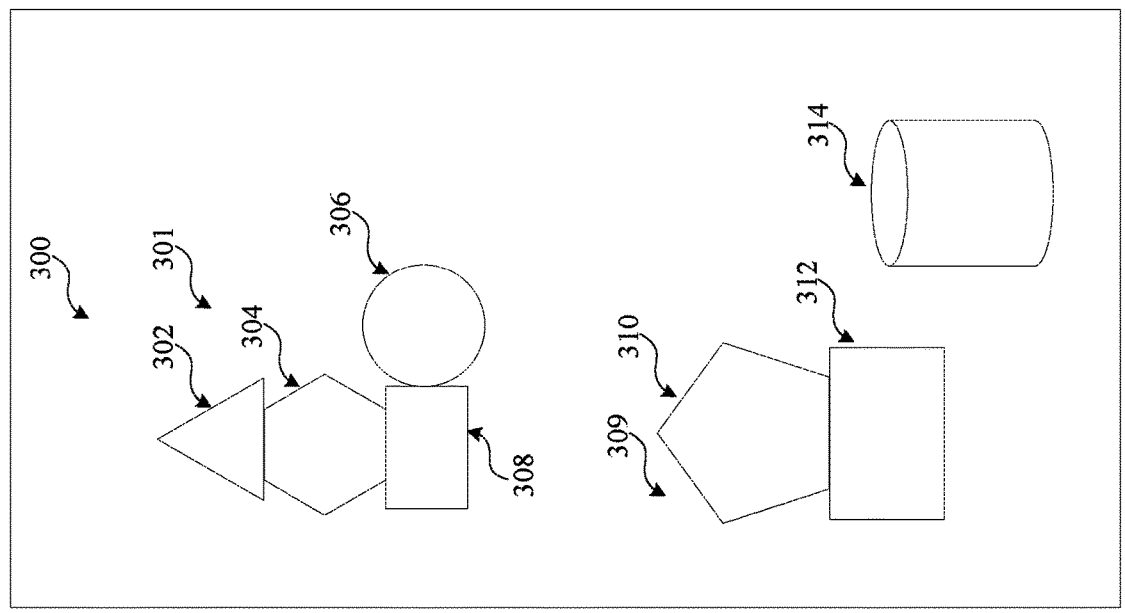

FIG. 7 illustrates an example graphical user interface with one or more packed objects, in accordance with embodiments of the disclosure. As described above, the graphical user interface may include models 301 and 309 and unconventional target object 314. As illustrated, FIG. 7 may depict user input indicating to stack target objects with similar geometries. Models 301 and 309 may be selected by the user for packing. The user may have provided user input selecting one or more features to pack models 301 and 309. The selected feature may be geometry, as described above. Accordingly, rectangles may be stacked in UDIM 1001, pentagons and hexagons may be packed in UDIM 1002, and circles and triangles may be packed in UDIM 1003. Target object 312 is stacked on top of target object 308 in UDIM 1001. In embodiments, the original ratio of the target object may be preserved, while in other embodiments, the target objects with similar geometries may be altered to have the same geometry and size. As described above, the definition of similar geometry may be broad or narrow. As illustrated, the definition of geometry may include rectangles in UDIM 1001, pentagons and hexagons in UDIM 1002, and all other shapes in UDIM 1003.

Figure 8:
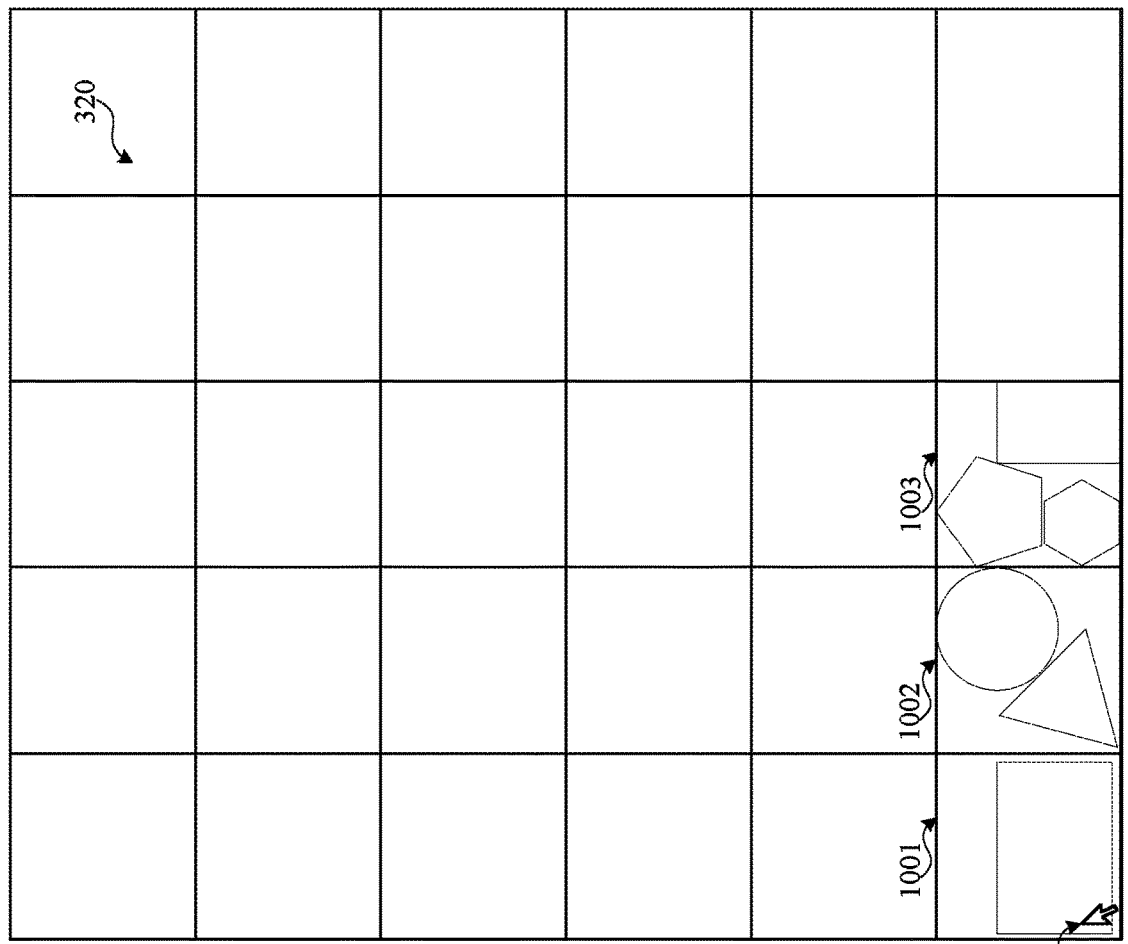
FIG. 8 illustrates an example graphical user interface with one or more packed objects, in accordance with embodiments of the disclosure.
Figure 8:
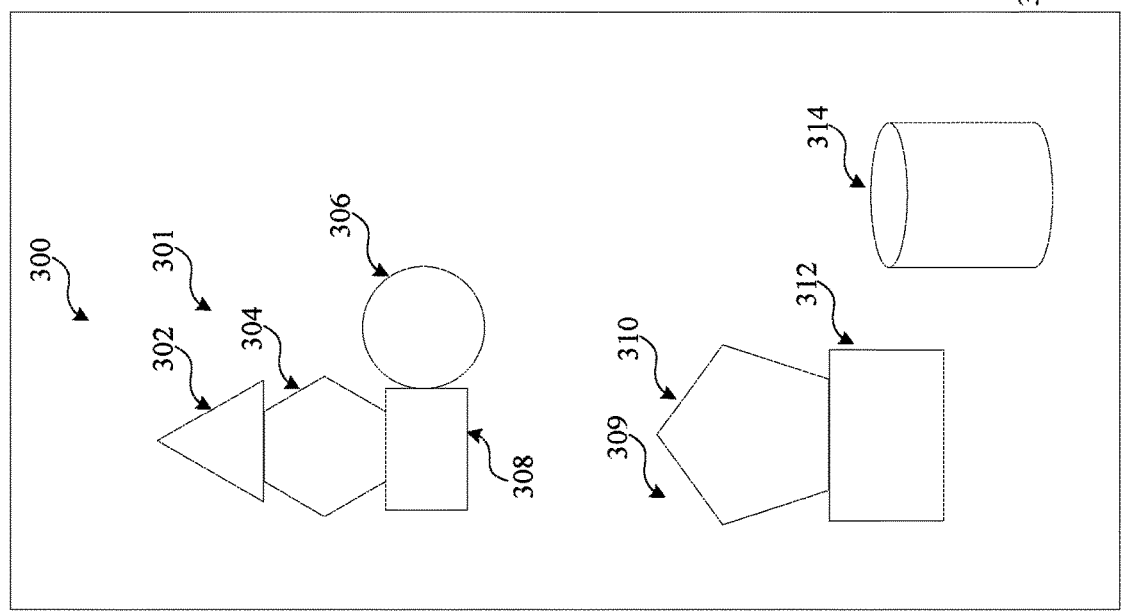

FIG. 8 illustrates an example graphical user interface with one or more packed objects, in accordance with embodiments of the disclosure. As described above, the graphical user interface may include models 301 and 309 and unconventional target object 314. As illustrated, FIG. 8 may depict packing models according to user input selecting one or more features, such as material. Models 301 and 309 may be selected by the user for packing. The user may have provided user input selecting one or more features to pack models 301 and 309. The selected feature may be the material for a given target object. Accordingly, target objects having a first material may be packed in UDIM 1001, target objects having a second material may be packed in UDIM 1002, and target objects having a third material may be packed in UDIM 1003. As described above, the definition of material may be broad or narrow. For example, target objects in UDIM 1001 may be metallic, target objects in UDIM 1002 may be leather, and target objects in UDIM 1003 may be plastic.

It should be appreciated that the above figures are merely exemplary, and the technology described herein may more efficiently pack the one or more target objects into the packing map.

The functionality described in the present disclosure may be utilized to improve the workflow for painting digital models. Instead of locating and organizing all of the pieces of one portion of a model, the present disclosure is able to organize and pack the target objects according to a user's input. The user may receive a model that has been prepared for editing. If the user wants all meshes, geometries, labeled items, and/or other features together, the user may use one or more keystrokes, buttons, and/or menus to pack the target objects adjacent to each other, if not in the same UDIM. Then the painter may easily paint similar target objects together and improve the workflow of receiving unpainted, unpacked models and generating ready-to-use pieces in content. For example, a digital painter may receive an unpainted, unpacked model of a car that is ready for painting. The digital painter may select user input to place all exterior pieces of the car together, all seat-related pieces of the car together, all the tire pieces together, etc. The painter may be able to paint all exterior pieces at the same time, all seat-related pieces at the same time, the tire pieces together, etc., thereby saving time on organization of the pieces. The painter's workflow is improved, and the painter is able to spend more time painting and creating textures. The painter may then send these painted objects as ready-to-go models to be used in various content (e.g., video games, movie, tv shows, digital experiences, ads, etc.), FIG. 9 illustrates example computing component 900, which may in some instances include a processor/controller resident on a computer system (e.g., server system 106 and/or electronic device 102). Computing component 900 may be used to implement various features and/or functionality of embodiments of the systems, devices, and methods disclosed herein. With regard to the above-described embodiments set forth herein in the context of systems, devices, and methods described with reference to FIGS. 1 through 8, including embodiments involving device 102 and/or server system 106, it may be appreciated additional variations and details regarding the functionality of these embodiments that may be carried out by computing component 900. In this connection, it will also be appreciated upon studying the present disclosure that features and aspects of the various embodiments (e.g., systems) described herein may be implemented with respect to other embodiments (e.g., methods) described herein without departing from the spirit of the disclosure.

As used herein, the term component may describe a given unit of functionality that may be performed in accordance with one or more embodiments of the present application. As used herein, a component may be implemented utilizing any form of hardware, software, or a combination thereof. For example, one or more processors, controllers, ASICs, PLAs, PALs, CPLDs, FPGAs, logical components, software routines, or other mechanisms may be implemented to make up a component. In implementation, the various components described herein may be implemented as discrete components or the functions and features described may be shared in part or in total among one or more components. In other words, it should be appreciated that after reading this description, the various features and functionality described herein may be implemented in any given application and may be implemented in one or more separate or shared components in various combinations and permutations. Even though various features or elements of functionality may be individually described or claimed as separate components, it will be appreciated that upon studying the present disclosure that these features and functionality may be shared among one or more common software and hardware elements, and such description shall not require or imply that separate hardware or software components are used to implement such features or functionality.

Where components of the application are implemented in whole or in part using software, in embodiments, these software elements may be implemented to operate with a computing or processing component capable of carrying out the functionality described with respect thereto. One such example computing component is shown in FIG. 9. Various embodiments are described in terms of example computing component 900. After reading this description, it will be appreciated how to implement example configurations described herein using other computing components or architectures.

Referring now to FIG. 9, computing component 900 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 900 is specifically purposed.

Computing component 900 may include, for example, one or more processors, controllers, control components, or other processing devices, such as a processor 910, and such as may be included in circuitry 905. Processor 910 may be implemented using a special-purpose processing engine such as, for example, a microprocessor, controller, or other control logic. In the illustrated example, processor 910 is connected to bus 955 by way of circuitry 905, although any communication medium may be used to facilitate interaction with other components of computing component 900 or to communicate externally.

Computing component 900 may also include one or more memory components, simply referred to herein as main memory 915. For example, random access memory (RAM) or other dynamic memory may be used for storing information and instructions to be executed by processor 910 or circuitry 905. Main memory 915 may also be used for storing temporary variables or other intermediate information during execution of instructions to be executed by processor 910 or circuitry 905. Computing component 900 may likewise include a read only memory (ROM) or other static storage device coupled to bus 955 for storing static information and instructions for processor 910 or circuitry 905.

Computing component 900 may also include one or more various forms of information storage devices 920, which may include, for example, media drive 930 and storage unit interface 935. Media drive 930 may include a drive or other mechanism to support fixed or removable storage media

925. For example, a hard disk drive, a floppy disk drive, a magnetic tape drive, an optical disk drive, a CD or DVD drive (R or RW), or other removable or fixed media drive may be provided. Accordingly, removable storage media 925 may include, for example, a hard disk, a floppy disk, magnetic tape, cartridge, optical disk, a CD or DVD, or other fixed or removable medium that is read by, written to, or accessed by media drive 930. As these examples illustrate, removable storage media 925 may include a computer usable storage medium having stored therein computer software or data.

In alternative embodiments, information storage devices 920 may include other similar instrumentalities for allowing computer programs or other instructions or data to be loaded into computing component 900. Such instrumentalities may include, for example, fixed or removable storage unit 940 and storage unit interface 935. Examples of such removable storage units 940 and storage unit interfaces 935 may include a program cartridge and cartridge interface, a removable memory (for example, a flash memory or other removable memory component) and memory slot, a PCMCIA slot and card, and other fixed or removable storage units 940 and storage unit interfaces 935 that allow software and data to be transferred from removable storage unit 940 to computing component 900.

Computing component 900 may also include a communications interface 950. Communications interface 950 may be used to allow software and data to be transferred between computing component 900 and external devices. Examples of communications interface 950 include a modem or softmodem, a network interface (such as an Ethernet, network interface card, WiMedia, IEEE 902.XX, or other interface), a communications port (such as for example, a USB port, IR port, RS232 port Bluetooth® interface, or other port), or other communications interface. Software and data transferred via communications interface 950 may typically be carried on signals, which may be electronic, electromagnetic (which includes optical) or other signals capable of being exchanged by a given communications interface 950. These signals may be provided to/from communications interface 950 via channel 945. Channel 945 may carry signals and may be implemented using a wired or wireless communication medium. Some non-limiting examples of channel 945 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 915, storage unit interface 935, removable storage media 925, and channel 945. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 900 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," "one or more," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will be appreciated after reading this document, the illustrated embodiments and their various alternatives may be implemented without confinement to the illustrated examples. For example, block diagrams and their accompanying description should not be construed as mandating a particular architecture or configuration.

What is claimed is:

1. A system, comprising:
a processor; and
a non-transitory computer-readable medium operatively coupled to the processor and storing instructions that, when executed, cause the processor to perform operations comprising:
presenting a UV map using a graphical user interface comprising a selection tool;
presenting a first set of multiple target objects using the graphical user interface, the target objects comprising multiple features;
presenting a representation of the features;

receiving a first user input selecting a first feature of the features in the representation; and after receiving the first user input selecting the first feature, packing two or more target objects of the first set having the same first feature at or adjacent to a first location of the UV map.

2. The system of claim 1, wherein the first user input comprises selecting and customizing the first feature for packing the first set of target objects.

3. The system of claim 1, wherein the operations further comprise:

receiving a selection tool user input to move the selection tool over the first location in the UV map;

in response to receiving the selection tool user input, moving the selection tool in the graphical user interface over the first location in the UV map; and receiving packing user input to pack the target objects of the first set having the same first feature; and wherein packing the two or more target objects, comprises: in response to receiving the packing user input, packing the two or more target objects of the first set having the same first feature at or adjacent to the first location of the UV map.

4. The system of claim 1, wherein the features comprise a mesh, geometry, size, material, title, texture, paint, color, surface, or metadata.

5. The system of claim 1, wherein the first feature is a geometry, wherein packing the two or more target objects comprises: stacking the two or more target objects in the first location in the UV map.

6. The system of claim 1, wherein the operations further comprise:

simplifying a geometry of an unconventional target object; and packing the simplified target object into the UV map.

7. The system of claim 6, wherein the simplified target object is the unconventional target object bounded by a rectangular shape.

8. The system of claim 1, wherein the operations further comprise:

presenting a second set of one or more target objects;

receiving a second user input; and based on the second user input, the features corresponding to the first set of target objects, and the second set of target objects, and the packed first set, pack the second set of target objects around the first set of target objects.

9. A computer-implemented method comprising:

presenting a UV map using a graphical user interface comprising a selection tool;

presenting a first set of multiple target objects using the graphical user interface, the target objects comprising multiple features;

presenting a representation of the features;

receiving a first user input selecting a first feature of the features in the representation; and after receiving the first user input selecting the first feature, packing two or more target objects of the first set having the same first feature at or adjacent to a first location of the UV map.

10. The method of claim 9, wherein the first user input comprises selecting and customizing the first feature for packing the first set of target objects.

11. The method of claim 9, wherein the operations further comprise:

receiving a selection tool user input to move the selection tool over the first location in the UV map;

in response to receiving the selection tool user input, moving the selection tool in the graphical user interface over the first location in the UV map; and receiving packing user input to pack the target objects of the first set having the same first feature; and wherein packing the two or more target objects, comprises: in response to receiving the packing user input, packing the two or more target objects of the first set having the same first feature at or adjacent to the first location of the UV map.

12. The method of claim 9, wherein the features comprise a mesh, geometry, size, material, title, texture, paint, color, or surface.

13. The method of claim 9, wherein the first feature is a geometry, wherein packing the two or more target objects comprises: stacking the two or more target objects in the first location in the UV map.

14. The method of claim 9, further comprising:

simplifying a geometry of an unconventional target object; and packing the simplified target object into the UV map.

15. The method of claim 14, wherein the simplified target object is the unconventional target object bounded by a rectangular shape.

16. The method of claim 9, further comprising:

presenting a second set of target objects;

receiving a second user input; and based on the second user input, the features corresponding to first set of target objects and the second set of one or more target objects, and the packed first set, packing the second set of one or more target objects around the first set of target objects.

17. A non-transitory computer-readable medium operatively coupled to the processor and storing instructions that, when executed, cause the processor to perform operations comprising:

presenting a UV map using a graphical user interface comprising a selection tool;

presenting a first set of multiple target objects using the graphical user interface, the target objects comprising multiple features;

presenting a representation of the features;

receiving a first user input selecting a first feature of the features in the representation; and after receiving the first user input selecting the first feature, packing two or more target objects of the first set having the same first feature at or adjacent to a first location of the UV map.

* * * * *